Nov. 6, 1934.   J. S. FORBES   1,979,611
VALVE
Filed April 9, 1932
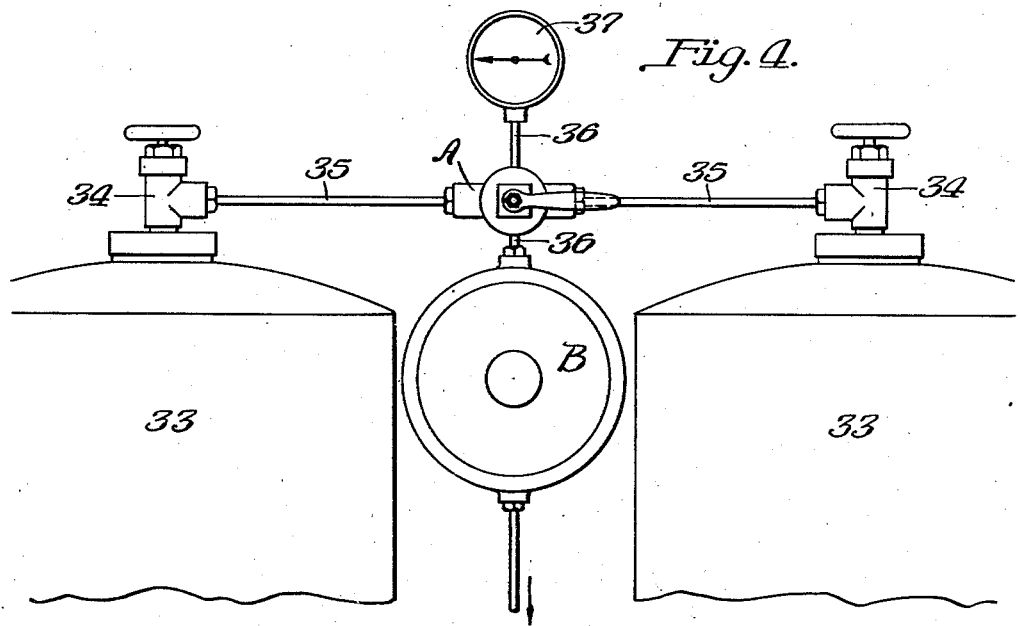
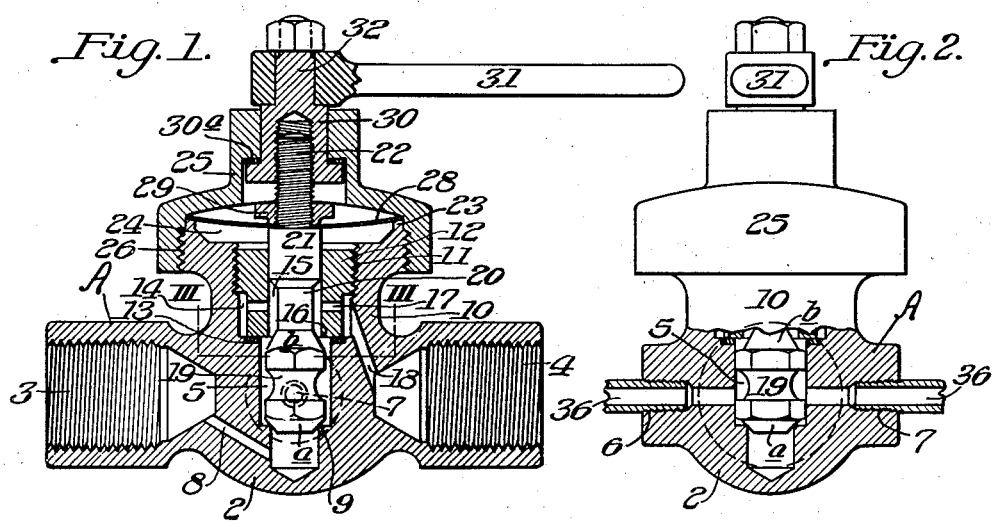
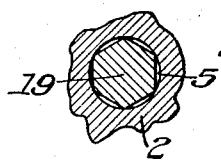
INVENTOR.
John S. Forbes
BY
ATTORNEY.

Patented Nov. 6, 1934

1,979,611

UNITED STATES PATENT OFFICE 1,979,611

VALVE

John S. Forbes, Pittsburgh, Pa., assignor to Kerotest Manufacturing Company, Pittsburgh, Pa., a corporation of Pennsylvania Application April 9, 1932, Serial No. 604,190

3 Claims. (Cl. 251—22)

This invention relates to improvements in valves of the character known in the art as packless valves, designed to be employed, for example, in connection with hydro-carbon gases, high pressure refrigeration fluids and the like, wherein it is necessary to effectively seal such valves against leakage during their operation.

Among the objects of my invention are to provide a novel and efficient valve of the character described; to provide a valve member having opposed conical faces operable for controlling the passage of fluid through said valve; and to provide a perforate diaphragm cooperating with said valve member for operating the same and sealing the valve body against the escape of fluid therefrom while the valve is in operation.

The invention may be more readily understood from the following description taken in connection with the accompanying drawing, wherein:

Fig. 1 is a cross sectional view of a valve constructed in accordance with my invention;

Fig. 2, an elevational view thereof at right angles to Fig. 1, partly in section;

Fig. 3, a detail section taken on the line III—III of Fig. 1; and

Fig. 4, a diagrammatic view of the valve applied between a pair of fluid tanks or receivers for controlling the flow of fluid therefrom.

Referring to the drawing, the valve A includes a hollow body 2 of a desired style or design. For example, I have shown said valve having a body of the manifold type, having aligned inlet ports or passages 3 and 4 internally threaded to accommodate the usual and well known tubing or pipe connections. Said body is also formed with a central valve chamber 5, and aligned outlet ports or fluid passages 6 and 7 communicating with said valve chamber and disposed at right angles to the ports or passages 3 and 4.

A fluid passage 8 connects the lower portion of the valve chamber 5 with the port or passage 3, and associated with this chamber I provide a valve seat 9.

The body 2 is formed with an upwardly extending portion 10 having an enlarged threaded central opening 11 therein for receiving a threaded member or plug 12. This plug engages a suitable gasket 13 in the bottom of opening 11, and is formed with a reduced lower end portion to provide an annular fluid passage 14 between said portion and the wall of the said opening.

A central intermediate chamber 15 is also provided in the plug 12 communicating with the valve chamber 5, said plug having a valve seat 16 at the lower end portion of said chamber. Lateral fluid ports or passages 17 are formed in the plug and extend between the passage 14 and the intermediate chamber 15. A fluid passage 18 connects said annular passage 14 with the fluid port or passage 4.

A valve member 19, including a valve head having opposed conical seating faces $a$ and $b$, is positioned within the chamber 5, said member also having a stem 20 formed with a reduced portion extending upwardly within and spaced from the wall of the intermediate chamber 15, an enlarged bearing and guiding portion 21, and a reduced threaded extension 22. Said valve member is preferably provided with polygonal portions between the seating faces $a$ and $b$ for guiding engagement with the wall of the valve chamber 5, as shown in Fig. 3.

Extension 10 of the body 2 is provided with a peripheral annular abutment or shoulder 23 surrounding a depression or recess in the upper surface thereof, forming a supplemental or diaphragm 24. 25 designates a bonnet having threaded engagement 26 with the extension 10.

Closing said chamber 24 is a metallic disk or other diaphragm 28 having its outer rim or periphery securely held and sealed between the abutment 23 and the bonnet 25. This diaphragm is centrally perforated to receive the threaded extension 22 of the valve stem 20. A nut 29 is provided for securely fastening said diaphragm on the stem.

Means are mounted in the bonnet 25 for translating the valve member 19 by means of its stem extension 22, including a flanged nut or threaded bushing 30 and a handle 31 secured to an extension 32 of said nut, said bushing 30 preferably having sealing engagement with a suitable gasket 30$a$ for sealing the bonnet.

The distance between the valve seats 9 and 16 is slightly greater than the distance between the respective contacting areas or surfaces of the conical seating faces on the valve member 19, requiring but a slight movement of said valve member to move it to closed or open positions. The resiliency of the diaphragm 28 assists the opening and closing movements of the valve member.

In Fig. 4 I have shown the manifold valve A connected between two fluid receivers or tanks 33 which may contain, for example, a light hydrocarbon gas or other fluid intended for domestic consumption for heating, cooking, lighting, etc. Suitable valves 34 are connected to the upper ends of the tanks and have outlets communicating with the ports or passages 3 and 4 of the valve A by means of conduits or pipes 35 secured to said valves by means of standard fittings or connections.

The aligned passages 6 and 7 of the valve body 2 are threaded to receive conduits or tubes 36, one of which may be utilized to convey the fluid to the stove, heater, or other point of use through a pressure regulator B, and the other conduit may be connected to a pressure gage 37.

The contents of the receiver 33 connected with the port or passage 3 of the valve A may be discharged through said valve by raising the valve member 19 so that the conical face $a$ disengages its seat 9, and the face $b$ engages its seat 16. The fluid admitted to the valve through the passage 3 will be conveyed to the valve chamber 5 through the passage 8 and be discharged through the passages 6 and 7 to the conduits 36 to indicate the pressure and be utilized as desired.

Similarly, the contents of the other receiver may be discharged by seating the valve member 19 on the seat 9, opening the intermediate chamber 15 to the valve chamber 5, and permitting the fluid to pass from the passage 4 through passage 18, annular passage 14, ports 17, into the intermediate chamber 15 and chamber 5, where it passes to the conduits 36.

During the latter operation of the valve, the diaphragm 28 will prevent the escape to the atmosphere of any fluid which may leak past the valve stem 20, and when operating in connection with the receiver communicating with the passage 3, any fluid which may be present in the valve or its connections above the seat 16 will also be retained within the valve by said diaphragm.

It is to be noted that in the event that the diaphragm 28 cracks or fractures during operation, by raising the valve member 19 to engage the face $b$ thereof with its seat 16, the contents of the receiver connected with the passage 3 may nevertheless be withdrawn and utilized, the said conical face and seat effectively sealing the intermediate chamber 15 from the valve chamber 5 and preventing fluid from reaching the broken diaphragm.

Likewise, the contents of the receiver connected with the passage 4 may be withdrawn in the event of failure of the diaphragm, the gasket 30$a$ preventing the escape of fluid to the atmosphere from the bonnet.

Various changes and modifications are contemplated, provided they fall within the scope of the following claims.

I claim:

1. In a valve, a hollow body having a valve chamber and fluid passages therein communicating with said chamber, a valve seat between one of said passages and the chamber, an intermediate chamber communicating with the valve chamber, a fluid passage communicating with the intermediate chamber, a valve seat between said chambers, a valve member in the valve chamber having opposed faces for alternately engaging said seats, a supplemental chamber adjoining the intermediate chamber, a diaphragm closing the supplemental chamber, said valve member having a valve stem extending from the valve chamber through the intermediate chamber and the diaphragm and connected to the diaphragm, with said stem having a reduced portion and an enlarged guiding portion on one side of the diaphragm, and a threaded portion on the opposite side of the diaphragm, said guiding portion cooperating with the wall of said intermediate chamber, and means cooperating with said threaded portion for moving said valve member.

2. In a valve, a hollow body having a valve chamber and a plurality of fluid inlet passages and a fluid outlet passage therein, one of said inlet passages and the outlet passage communicating with said chamber, a valve seat between said inlet passage and chamber, a centrally bored plug mounted in the body having a valve seat thereon, a valve member in the valve chamber having opposed faces for alternately engaging said seats, a supplemental chamber spaced from the valve chamber, a diaphragm closing the supplemental chamber, said valve member having a valve stem extending from the valve chamber through said plug and diaphragm and connected with the diaphragm, with said stem having a reduced portion and an enlarged guiding portion on one side of the diaphragm and a threaded portion on the opposite side of the diaphragm, said guiding portion coacting with the bore of the plug, another of said inlet passages communicating with the interior of the plug around said reduced portion, and means for moving said valve member.

3. In a valve, a hollow body having a valve chamber therein, a plug mounted in the body having a second chamber therein and a reduced portion providing an annular fluid passage between said plug and body, said plug also having a transverse fluid port extending between said second chamber and annular passage, a valve seat between said chambers, fluid passages communicating with said valve chamber, a valve seat between one of said passages and the valve chamber, a fluid passage communicating with the annular passage, a valve member in the valve chamber having opposed faces for alternately engaging said seats, a stem for the valve member, a supplemental chamber adjoining said second chamber, a diaphragm closing the supplemental chamber and connected with the valve stem, and means for moving said valve member.

JOHN S. FORBES.